United States Patent
Nichols

[11] 3,870,360
[45] Mar. 11, 1975

[54] PICKUP TRUCK SPARE TIRE MOUNT AND COVER

[76] Inventor: William W. Nichols, 4218 Delwood, Odessa, Tex. 79760

[22] Filed: Sept. 21, 1973

[21] Appl. No.: 399,615

[52] U.S. Cl............ 296/37 A, 224/42.2, 224/42.25
[51] Int. Cl............................................. B60r 7/00
[58] Field of Search......... 296/37 A, 37.2, 37 R, 43, 296/137 B; 224/42.06, 42.12, 42.13, 42.2, 42.25, 42.24, 42.21, 42.42, 29

[56] References Cited
UNITED STATES PATENTS

| | | | |
|---|---|---|---|
| 1,606,351 | 11/1926 | Donachy............................ | 296/37 A |
| 2,117,049 | 5/1938 | Widman............................. | 296/37.2 |
| 2,901,286 | 8/1959 | Harris.......................... | 296/137 B X |
| 3,715,066 | 2/1973 | Owen............................... | 224/42.42 |

FOREIGN PATENTS OR APPLICATIONS

| | | | |
|---|---|---|---|
| 862,378 | 3/1961 | Great Britain..................... | 296/39 R |
| 130,715 | 9/1918 | Great Britain..................... | 296/37 A |

Primary Examiner—Albert J. Makay
Attorney, Agent, or Firm—Clarence A. O'Brien; Harvey B. Jacobson

[57] ABSTRACT

A hollow upstanding downwardly opening housing is provided and includes a horizontally disposed semi-cylindrical upper portion closed at its top. In addition, the lower portion of one side wall of the housing is omitted. The housing includes structure for removably supporting the housing in an upright position immediately inwardly of one side wall portion of the load bed of a pickup truck with the open bottom of the housing resting upon the load bed floor. Also, the width of the housing between its opposite side walls is slightly greater than the width of a pickup truck tire and wheel and the overall height of the housing is slightly greater than the diameter of a pickup truck wheel and tire. After positioning the spare tire of a pickup truck immediately inwardly of and alongside one side wall of the load bed of a pickup truck with the spare tire disposed in upright position the housing may be downwardly telescoped over the spare tire and releasably secured and locked in position over the spare tire. In this manner, the housing maintains the spare tire in its designated position within the pickup truck load bed and inasmuch as the housing is removably locked in position against unauthorized removal the spare tire over which the housing is downwardly telescoped is also locked in its designated position within the pickup truck load bed against unauthorized removal.

9 Claims, 4 Drawing Figures

PICKUP TRUCK SPARE TIRE MOUNT AND COVER

The main object of this invention is to provide an apparatus which will enable a pickup truck's spare tire to be stored within the load bed of the pickup truck in upstanding position adjacent the inner surface of one side wall of the load bed, whereby the spare tire may be readily removed when needed without requiring the removal of the spare tire from its normal horizontally disposed stored position beneath the load bed of a pickup truck.

Another object of this invention is to provide an apparatus in accordance with the preceding objects and which will also enable storage of a pickup truck spare tire and wheel within the load bed of a pickup truck in a locked manner whereby the spare tire will be protected against unauthorized removal.

Still another object of this invention is to provide an apparatus for mounting a pickup truck spare tire within the load bed of a pickup truck with the spare tire protected from the elements.

Another important object of this invention is to provide an apparatus for storing a spare tire within the load bed of a pickup truck in a manner whereby a minimum amount of the interior of the load bed will be occupied by the spare tire.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
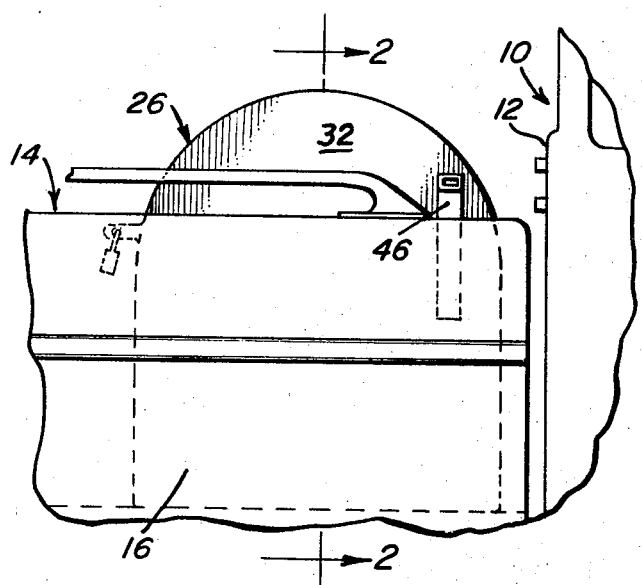
FIG. 1 is a fragmentary side elevational view of a pickup truck with the spare tire cover of the instant invention in operative association with a spare tire positioned within the pickup truck load bed.

Referring now more specifically to the drawings, the numeral 10 generally designates a conventional form of pickup truck 10 including a cab 12 and a load bed referred to in general by the reference numeral 14. The load bed 14 includes a pair of upstanding longitudinal opposite side walls 16 interconnected at their lower ends by means of a bottom wall 18 and interconnected at their forward ends by means of a front wall 20 which projects upwardly from the forward marginal edge portion of the bottom wall 18.

Both side walls 16 include longitudinally spaced stake receiving sockets 22 spaced longitudinally therealong and which open upwardly through the upper marginal edge portions of the side walls 16.

A spare tire and wheel assembly is referred to in general by the reference numeral 24 and is positioned immediately inwardly of the right hand side wall 16 adjacent the front or forward wall 20. The spare tire and wheel assembly 24 is disposed in upstanding position so that the assembly 24 will occupy a minimum of the internal plan area of the load bed 14 and the spare tire mount and cover of the instant invention which is referred to in general by the reference numeral 26 is operatively associated with the right hand side wall 16 and spare tire and wheel assembly 24 in each of the figures of the drawings and functions to maintain the spare tire and wheel assembly 24 in its designated position and against unauthorized removal.

The spare tire mount and cover comprises an upstanding housing 28 including inner and outer side walls 30 and 32. The inner side wall 30 includes an upwardly arched semi-circular upper marginal edge portion 34 and the outer side wall 32 includes a similar upwardly arched semi-circular upper marginal edge portion 36. The overall height of the inner side wall 30 is approximately twice the diameter of the semi-circular upper marginal edge portion 34 and a peripheral wall 38 extends and is secured between corresponding marginal edge portions of the inner and outer walls 30 and 32, the lower portion of the outer side wall 32 disposed below the elevation of the upper marginal portion of the right hand side wall 16 being omitted. Accordingly, the peripheral wall 38 includes a semi-cylindrical and downwardly opening upper portion 40 and upstanding parallel front and rear lower portions 42 and 44 whose lower marginal edges abut the bottom wall 18, the lower marginal edge portion of the inner side wall 30 also abutting the bottom wall or flooring 18.

The forward portion of the outer side wall 32 includes a depending stake 46 secured to the outer surface of the outer side wall 32 in any convenient manner such as by welding and the upper end of the stake 46 is beveled as at 48.

Figure 2:
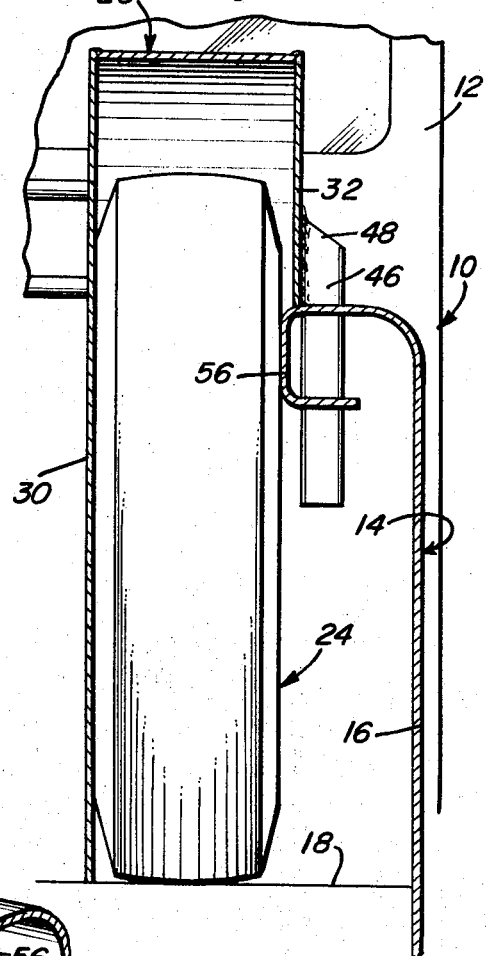
FIG. 2 is an enlarged fragmentary transverse vertical sectional view taken substantially upon the plane indicated by the section line 2—2 of FIG. 1.
Figure 3:
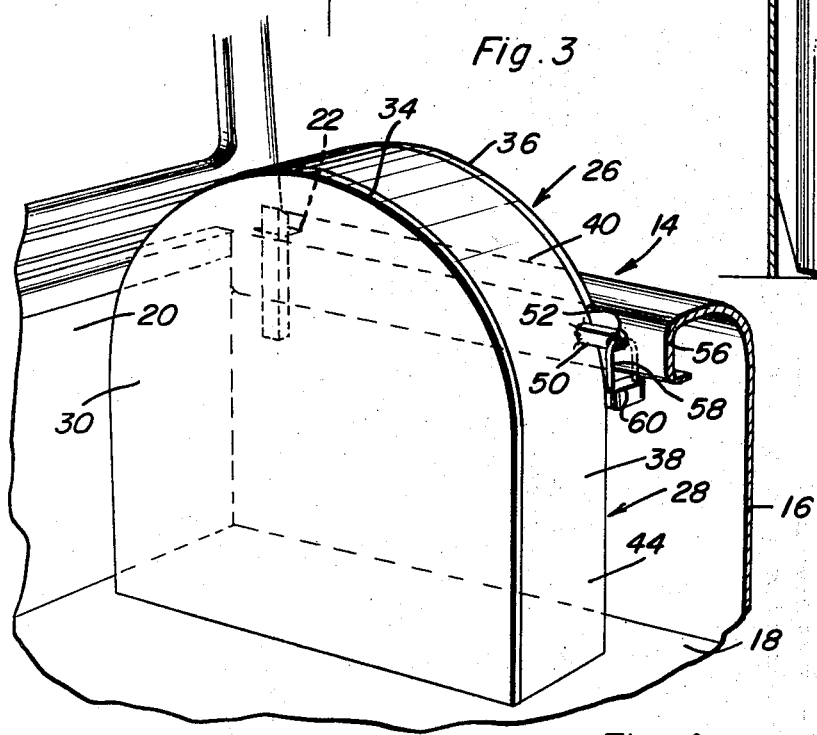
FIG. 3 is a perspective view of the spare tire mount and cover of the instant invention operatively mounted within the load bed of the pickup truck.
Figure 4:
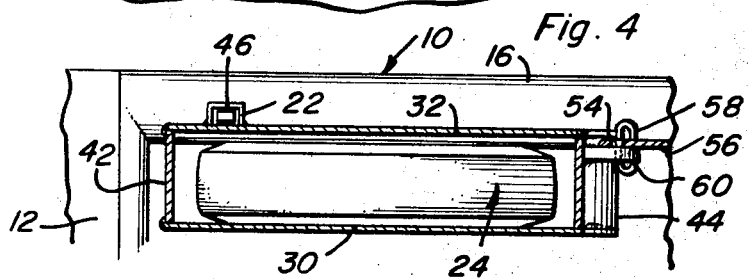
FIG. 4 is a fragmentary horizontal sectional view taken substantially upon a plane passing through the spare tire mount and cover at an elevation coinciding with the upper surface of the adjacent pickup truck load bed side wall.

After the spare tire and wheel assembly 24 is positioned as illustrated in FIGS. 2 and 4 of the drawings, the housing 28 is downwardly telescoped over the spare tire and wheel assembly 24 in a manner such that the lower end of the stake 46 is downwardly telescoped into the existing socket 22. It will be noted that the socket 22 is generally square in horizontal cross-sectional shape and that the stake 46 is also generally square in horizontal cross-sectional shape and reasonably snugly downwardly telescoped into the socket 22. In this manner, if it is not desired to lock the spare tire mount and cover 26 in position, the engagement of the square stake 46 in the square socket 22 will prevent angular displacement of the housing 28 about an axis extending vertically through the center of the stake 46. However, the rear lower portion of the semi-cylindrical upper portion 40 of the peripheral wall 38 is provided with a horizontal rearwardly projecting mounting lug 50 provided with a horizontal transverse aperture 52 at its rear end and the aperture 52 is horizontally registered with an aperture 54 formed in the downturned portion 56 of the upper marginal edge portion of the right hand load bed side wall 16. If it is desired to lock the spare tire mount and cover 26 in position, the hasp portion 58 of a padlock 60 is passed through the aligned bores 52 and 54 after which the padlock 60 may be locked. In this manner, the padlock 60 not only prevents vertical upward movement of the spare tire mount and cover 26 but also angular displacement of the cover 26 about an upstanding axis extending centrally through the stake 46. In addition, because the stake 46 is snugly received in the socket 22, angular displacement of the spare tire mount and cover 26 about an axis extending through the registered apertures 52 and 54 is prevented. Nevertheless, when the padlock 60 is unlocked and the hasp 58 is removed from the apertures 52 and 54, the spare tire mount and cover may be readily removed in order to expose the spare tire and wheel assembly 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a pickup truck load bed of the type including a floor and a side wall projecting upwardly from said floor provided with an upwardly opening socket of appreciable vertical extent in the upper marginal edge portion of said side wall, a hollow vertically elongated downwardly opening upstanding housing disposed immediately inwardly of and extending along the inner side of said side wall and directly removably supported on said floor with one side of said housing adjacent and opposing said inner side of said side wall, said housing being of a height and width to be downwardly telescoped over an upstanding pickup truck spare tire and wheel supported on said floor in upright position immediately inwardly of said side wall, said housing including an upper portion projecting above said side wall, said upper portion of said housing including a depending stake supported from the housing and removably downwardly telescoped in said socket.

2. The combination of claim 1 wherein said stake is supported from the outer surface of said one side of said housing.

3. The combination of claim 1 wherein the lower marginal portion of said one side of said housing is generally horizontal and spaced appreciably above the bottom of said housing at the elevation of the upper marginal edge portion of said side wall of said load bed.

4. The combination of claim 3 wherein said stake is supported from the outer surface of said one side of said housing.

5. The combination of claim 1 wherein said socket is of non-circular configuration in horizontal cross section and said stake is of a corresponding horizontal cross-sectional area whereby the telescopic engagement of said stake in said socket will prevent more than slight angular displacement of said stake about its longitudinal axis in said socket.

6. The combination of claim 1 wherein said socket is disposed adjacent the forward end of said side wall and said stake is carried by the forward extremity of said one side of said housing.

7. The combination of claim 1 wherein the upper portion of said housing defines a downwardly opening closed-ended hollow semi-cylindrical housing portion.

8. The combination of claim 6 including means releasably locking the rear portion of said housing to an adjacent portion of said load bed side wall.

9. The combination of claim 8 wherein said socket is of non-circular configuration in horizontal cross section and said stake is of a corresponding horizontal cross section whereby the telescopic engagement of said stake in said socket will prevent more than slight angular displacement of said stake about its longitudinal axis in said socket.

* * * * *